United States Patent
Zhou (10) Patent No.: US 9,904,686 B2
(45) Date of Patent: Feb. 27, 2018

(54) METHOD AND TERMINAL FOR CREATING NEW FOLDER ON TOUCH SCREEN EQUIPMENT

(75) Inventor: Huihong Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 247 days.

(21) Appl. No.: 14/380,175

(22) PCT Filed: Apr. 12, 2012

(86) PCT No.: PCT/CN2012/073895
§ 371 (c)(1),
(2), (4) Date: Aug. 21, 2014

(87) PCT Pub. No.: WO2013/123700
PCT Pub. Date: Aug. 29, 2013

(65) Prior Publication Data
US 2015/0020015 A1    Jan. 15, 2015

(30) Foreign Application Priority Data
Feb. 24, 2012 (CN) .......................... 2012 1 0043468

(51) Int. Cl.
*G06F 3/0482* (2013.01)
*G06F 17/30* (2006.01)
(Continued)

(52) U.S. Cl.
CPC ...... *G06F 17/30126* (2013.01); *G06F 3/0482* (2013.01); *G06F 3/0486* (2013.01);
(Continued)

(58) Field of Classification Search
CPC .... G06F 3/0482; G06F 3/0486; G06F 3/0488; G06F 3/04883; G06F 3/04817;
(Continued)

(56) References Cited

U.S. PATENT DOCUMENTS

| | | | | |
|---|---|---|---|---|
| 6,020,895 A | * | 2/2000 | Azami | ........... G06F 3/0481 345/619 |
| 2010/0146425 A1 | * | 6/2010 | Lance | ........... G06F 3/0486 715/769 |

(Continued)

FOREIGN PATENT DOCUMENTS

| | | |
|---|---|---|
| CN | 101661350 A | 3/2010 |
| CN | 101710268 A | 5/2010 |

(Continued)

OTHER PUBLICATIONS

International Search Report for PCT/CN2012/073895 dated Aug. 17, 2012.

*Primary Examiner* — Tuyetlien T Tran
(74) *Attorney, Agent, or Firm* — Ling Wu; Stephen Yang; Ling and Yang Intellectual Property (57) ABSTRACT

A method and terminal for creating a new folder on a touch screen device are provided. One method includes: creating a new folder at any vacant position on a current interface after a touch screen device detects that an object on the current interface is selected and dragged to a specific area and released, and saving the object in the new folder. Another method includes: creating a new folder at any vacant position on a current interface after the touch screen device detects that at least two objects on the current interface are successively selected and within a preset time range, dragged in succession to a specific area and released; and saving the at least two objects in the new folder.

12 Claims, 4 Drawing Sheets

(51) Int. Cl.
*G06F 3/0488* (2013.01)
*G06F 3/0486* (2013.01)
*H04M 1/725* (2006.01)
*G06F 3/0481* (2013.01)

(52) U.S. Cl.
CPC ........ *G06F 3/0488* (2013.01); *G06F 3/04883* (2013.01); *G06F 3/04817* (2013.01); *H04M 1/72522* (2013.01); *H04M 2250/22* (2013.01)

(58) Field of Classification Search
CPC .............. G06F 3/0481; G06F 3/04842; H04M 1/72522; H04M 2250/22; G06Q 10/10
See application file for complete search history.

(56) References Cited

U.S. PATENT DOCUMENTS

| | | | |
|---|---|---|---|
| 2010/0257471 A1* | 10/2010 | Ang | G06F 3/04817 715/769 |
| 2011/0252346 A1 | 10/2011 | Chaudhri | |
| 2012/0030628 A1* | 2/2012 | Lee | G06F 3/0486 715/835 |
| 2012/0042272 A1 | 2/2012 | Hong | |
| 2013/0055127 A1* | 2/2013 | Saito | G06F 3/0486 715/769 |

FOREIGN PATENT DOCUMENTS

| | | |
|---|---|---|
| CN | 101907974 A | 12/2010 |
| CN | 102214070 A | 10/2011 |
| CN | 102243573 A | 11/2011 |
| EP | 2372516 A | 10/2011 |
| EP | 2418572 A2 | 2/2012 |
| WO | 2007008524 A2 | 1/2007 |
| WO | 2012018212 A2 | 2/2012 |

\* cited by examiner

METHOD AND TERMINAL FOR CREATING NEW FOLDER ON TOUCH SCREEN EQUIPMENT

TECHNICAL FIELD

The patent document relates to the electronic technology field, and in particular, to a method and terminal for creating a new folder on a touch screen device.

BACKGROUND OF THE RELATED ART

With the development of the electronic technology, using the device for touching the screen (abbreviated as the touch screen device hereinafter) becomes more and more popular, such as, the mobile phone, the tablet computer, the Portable Media Player (PMP), the E-ink book, etc.

The popularization of the device promotes the demand of the user to ask for more services provided by the mobile Internet. The Internet Data Center (IDC) analyzes that the downloads of the mobile applications will be close to 76,900 million times by 2014. The rapid development of the applications makes the quantity of information stored by the user device present an explosive increase, and the folder, used as a common mode for managing the information, has been popularized in the users.

At present, the forms of creating the new folders on most touch screen devices mainly include the following two ways:

1, an empty folder is created by selecting through a menu mode;

there are the following shortcomings during creating the new folder with this method: at least the current page needs the space to put the newly-created folder, and the operation mode is not intuitive.

2, the collision of two files forms a folder;

when adopting this mode, it must find two files which are considered to be of one kind, then it could form one new folder through the collision.

In sum, the current mode for creating the new folder is monotonous, and cannot bring better user experience to the users.

Content of the Invention

The objective of the embodiment of the present invention is to provide a method and terminal for creating a new folder on a touch screen device, to improve user creating efficiency, thereby improving the user experience.

In order to solve the above-mentioned problem, the embodiment of the present invention provides a method for creating a new folder on a touch screen device, comprising:

creating a new folder at any vacant position on a current interface after a touch screen device detects that an object on the current interface is selected and dragged to a specific area and released, and saving the object in the new folder.

Alternatively, creating a new folder at any vacant position on a current interface comprises:

creating a new folder at a position where the object is located before the object is dragged.

Alternatively, the specific area has already been displayed in the vacant position of the current interface before the object is selected; or the touch screen device just displays the specific area on the current interface when detecting that the object is selected, and the specific area does not comprise other folder in a display range of the current interface.

Alternatively, before creating a new folder at any vacant position on a current interface, it further comprises:

the touch screen device determining whether the type of the object belongs to a range of preconfigured acceptance property of folder on the current interface;

creating a new folder at any vacant position on a current interface comprises:

if determining that the type of the object belongs to the range of the preconfigured acceptance property of folder under the current interface, then creating a new folder at any vacant position on the current interface.

Alternatively, the above-mentioned method further comprises:

if the touch screen device determines that the type of the object does not belongs to the range of the preconfigured acceptance property of folder in the current interface, then prompting that creation of a folder fails.

Accordingly, the patent document further provides another method for creating a new folder on a touch screen device, comprising:

creating a new folder at any vacant position on a current interface after the touch screen device detects that at least two objects on the current interface are successively selected and within a preset time range, dragged in succession to a specific area and released, and saving the at least two objects in the new folder.

Alternatively, creating a new folder at any vacant position on a current interface comprises:

creating a new folder at a position where any one object of said at least two objects is located before the object is dragged.

Alternatively, before creating a new folder at a position where any one object of the at least two objects is located before the object is dragged, it further comprises:

the touch screen device determining whether all types of the at least two objects belong to a range of preconfigured acceptance property of folder in the current interface;

creating a new folder at any vacant position on a current interface and saving the at least two objects in the new folder further comprises:

in the at least two objects, the touch screen device creating a new folder at a position where any one object is located before said any one object is dragged, wherein, the type of said any one object belongs to the range of the preconfigured acceptance property of folder in the current interface, and then saving all objects of which the types belong to the range of the preconfigured acceptance property of folder in the current interface into the new folder.

Alternatively, the touch screen device detecting that at least two objects on the current interface are successively selected and within a preset time range, dragged in succession to a specific area and released comprises:

whenever the touch screen device detects that one object on the current interface is selected and dragged to the specific area and released, starting timing; if determining that another object is selected and dragged to the specific area and released in the preset time range, then restarting the timing, until no object is selected or dragged to the specific area and released in the preset time range.

Alternatively, the touch screen device detecting that at least two objects on the current interface are successively selected and within a preset time range, dragged in succession to a specific area and released comprises:

when the touch screen device detects that one object on the current interface is selected and dragged to the specific area and released, starting timing, and counting the objects which are selected and dragged to the specific area and released in the preset time range.

Alternatively, the specific area has already been displayed in the vacant position of the current interface before a first object is selected; or the touch screen device just displays the specific area on the current interface when detecting that the first object is selected, and the specific area does not comprise other folder in a display range of the current interface.

Accordingly, the patent document further provides a terminal, configured with a touch screen thereon, comprising:

a detection unit, configured to: detect operation actions performed by external to each object displayed on the touch screen; and a creating unit, configured to: create a new folder at any vacant position on a current interface after the detection unit detects that an object on the current interface is selected and dragged to a specific area and released, and save the object in the new folder.

Alternatively, the creating unit is configured to create a new folder at a position where the object is located before the object is dragged.

Alternatively, the terminal further comprises a display unit;

the display unit is configured to display the specific area in the vacant position of the current interface before the object is selected; or the display unit is configured to just display the specific area on the current interface when the detection unit detects that the object is selected, wherein the specific area does not comprise other folder in a display range of the current interface.

Alternatively, the detection unit is further configured to determine whether the type of the object belongs to a range of preconfigured acceptance property of folder in the current interface;

the creating unit is configured to: when the detection unit determines that the type of the object belongs to the range of the preconfigured acceptance property of folder in the current interface, then create a new folder at any vacant position on the current interface.

Alternatively, the display unit is further configured to: when the detection unit determines that the type of the object does not belongs to the range of the preconfigured acceptance property of folder in the current interface, prompt that creation of a folder fails.

Accordingly, the patent document further provides another terminal, configured with a touch screen thereon, comprising:

a detection unit, configured to: detect operation actions performed by external to each object displayed on the touch screen; and a creating unit, configured to: create a new folder at any vacant position on a current interface after the detection unit detects that at least two objects on the current interface are successively selected and within a preset time range, dragged in succession to a specific area and released, and save the at least two objects in the new folder.

Alternatively, the creation unit is configured to create a new folder at a position where any one object of the at least two objects is located before the object is dragged.

Alternatively, the detection unit is further configured to determine whether all types of the at least two objects belong to a range of preconfigured acceptance property of folder in the current interface;

the creating unit is configured to: in the at least two objects, create a new folder at a position where any one object is located before said any one object is dragged, wherein, the type of said any one object belongs to the range of the preconfigured acceptance property of folder in the current interface, and then save all objects of which the types belong to the range of the preconfigured acceptance property of folder in the current interface into the new folder.

Alternatively, the detection unit is configured to: start timing whenever detecting that one object on the current interface is selected and dragged to the specific area and released; if determining that another object is selected and dragged to the specific area and released in the preset time range, then restart the timing, until no object is selected or dragged to the specific area and released in the preset time range.

Alternatively, the detection unit is configured to: detect that at least two objects on the current interface are successively selected and within a preset time range, dragged in succession to a specific area and released, specifically comprising:

the detection unit is configured to: start timing when detecting that one object on the current interface is selected and dragged to the specific area and released, and count the objects which are selected and dragged to the specific area in the preset time range.

Alternatively, the terminal further comprises a display unit;

the display unit is configured to display the specific area in the vacant position of the current interface before the object is selected; or the display unit is configured to just display the specific area on the current interface when the detection unit detects that the object is selected, wherein the specific area does not comprise other folder in a display range of the current interface.

Compared with the related art, the creation of a new folder is more intuitive in the embodiment of the present invention, and it is unnecessary to reserve space for a newly created folder or unnecessary to determine the type of files in advance. The patent document can further improve user operation efficiency of creating and successively adding into a folder, thereby improving the user experience.

PREFERRED EMBODIMENTS OF THE PRESENT INVENTION

The embodiment of the present invention is described in detail with reference to the accompanying drawings hereinafter. It should be illustrated that, in the case of not conflicting, the embodiments in the present application and features in these embodiments can be combined with each other.

Figure 1:
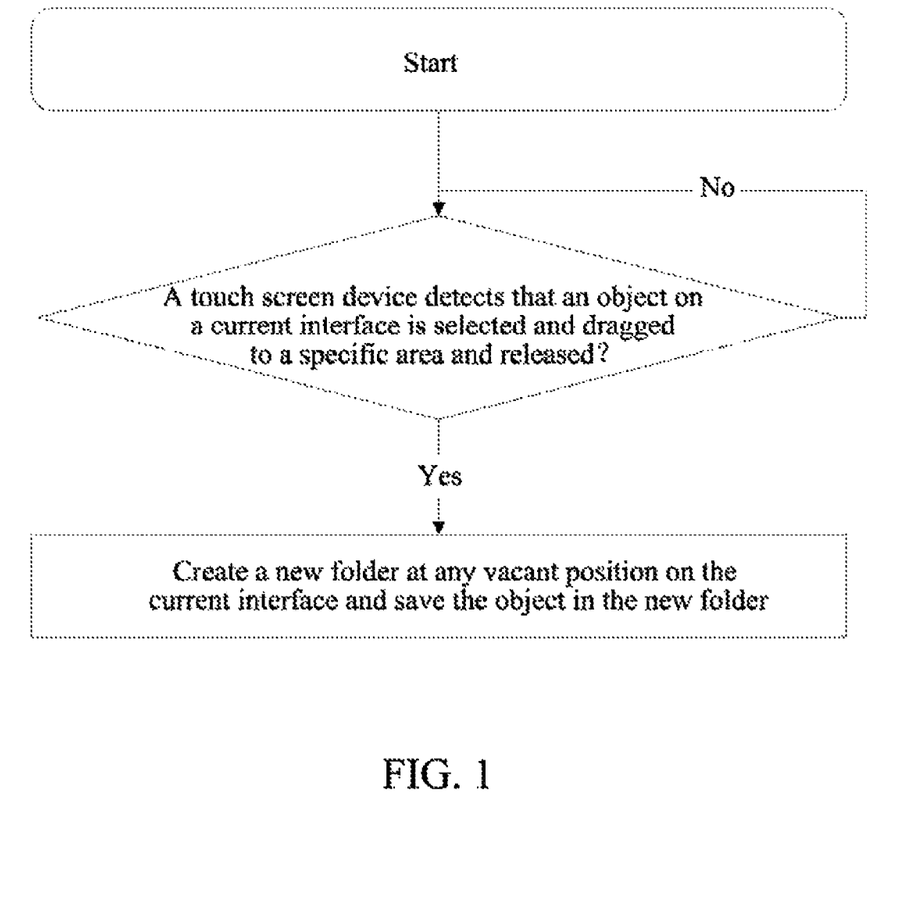
FIG. 1 is a flow chart of a method for creating a new folder on a touch screen device according to an embodiment of the present invention.

In the present embodiment, a method for creating a new folder on a touch screen device, as shown in FIG. 1, includes:

creating a new folder at any vacant position on a current interface after a touch screen device detects that an object on the current interface is selected and dragged to a specific area and released, and saving the object in the new folder. Wherein, the any vacant position is preferably the position where the object is located before it is dragged. In this way, there is no need to reserve a vacant position on the interface when creating a new folder.

In addition, during the specific implementation, the specific area can be already displayed on the vacant position of the current interface before the object is selected; and also it can be just displayed when the object is selected, and the display area on the current interface cannot include other existing folder, in case of misoperation.

In order to prevent adding the object, which should not be added to the folder, to the folder, the touch screen device further can determine whether the type of the object belongs to a range of preconfigured acceptance property of folder in the current interface after detecting that an object on the current interface is selected and dragged to a specific area and released; if yes, then one new folder is created and the object is saved in the new folder; if no, then the operation of creating the new folder is not executed, and it can prompt the users that the type of the object does not meet the requirements, and the creation of the folder fails.

Figure 2:
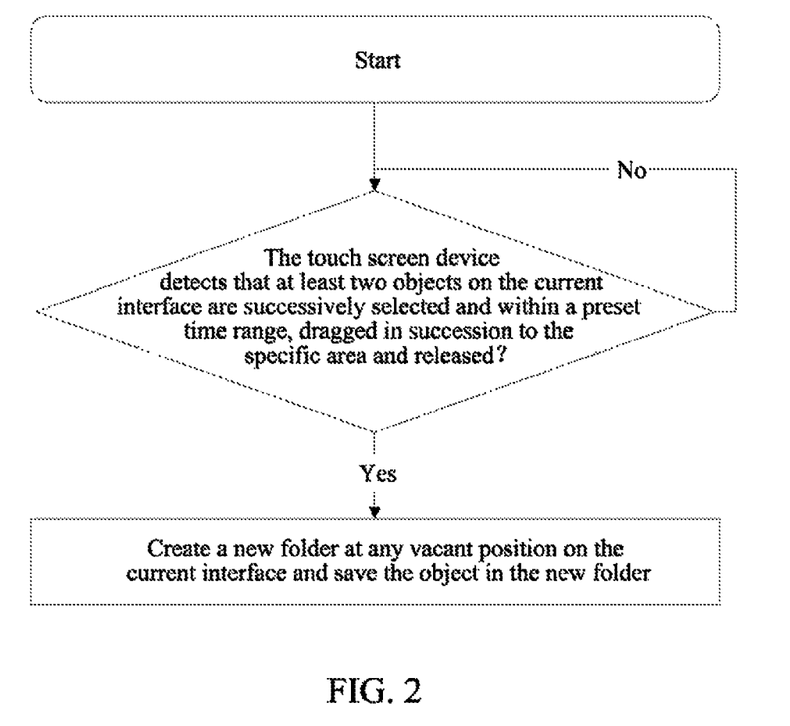
FIG. 2 is a flow chart of another method for creating a new folder on a touch screen device according to an embodiment of the present invention.

In the present embodiment, another method for creating a new folder on a touch screen device, as shown in FIG. 2, including:

creating a new folder at any vacant position on a current interface after the touch screen device detects that at least two objects on the current interface are successively selected and within a preset time range, dragged in succession to a specific area and released, and saving the at least two objects in the new folder. Wherein, the any vacant position is preferably the position where the object is located before it is dragged. In this way, there is no need to reserve a vacant position on the interface when creating a new folder.

In the specific implementation, detecting that at least two objects on the current interface are successively selected and within a preset time range, dragged in succession to a specific area and released can be implemented by any one of the two following ways:

in way one, whenever the touch screen device detects that one object on the current interface is selected and dragged to the specific area and released, timing is started; if it is determined that another object is selected and dragged to the specific area and released in the preset time range, then the timing is restarted, until no object is selected or dragged to the specific area and released in the preset time range.

In way two: when the touch screen device detects that one object on the current interface is selected and dragged to the specific area and released, the timing is started, and the objects which are selected and dragged to the specific area in the preset time range are counted.

In order to prevent adding the object, which should not be added to the folder, to the folder, the touch screen device further can determine whether all types of the at least two objects belong to a range of preconfigured acceptance property of folder in the current interface after detecting that at least two objects on the current interface are selected and within a preset time range, dragged in succession to a specific area and released; if at least part of objects belong to the range, then one new folder is created and the objects belonged to that range are saved in the new folder; for the objects which does not belong to that range, and it can prompt the users that the type of the object does not meet the requirements.

There can be many kinds of UI layouts in the above-mentioned method.

Figure 3:
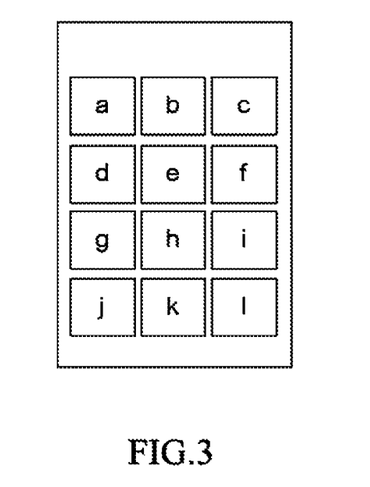
FIG. 3 is an original square layout status without a specific area according to an embodiment of the present invention.
Figure 7:
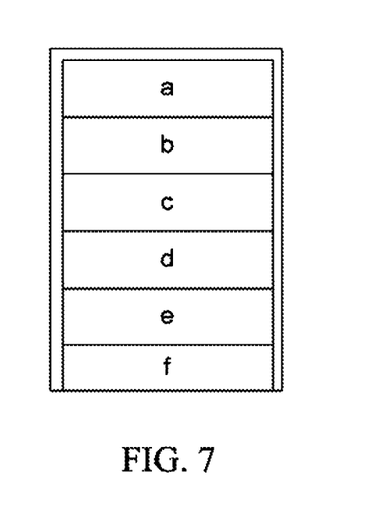
FIG. 7 is an original list layout status without a specific area according to an embodiment of the present invention.

As shown in FIG. 3 and FIG. 7, the above-mentioned method is suitable for the square layout or list layout of objects.

Figure 4:
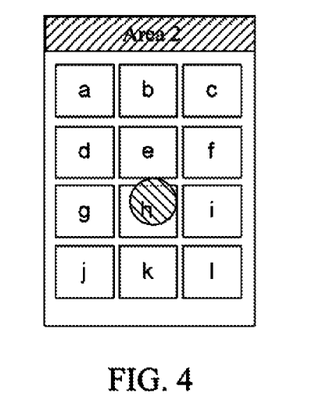
FIG. 4 is a first gesture triggering status according to an embodiment of the present invention.
Figure 5:
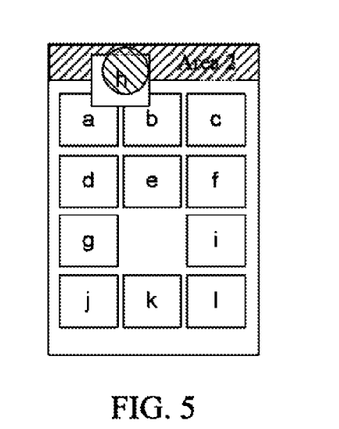
FIG. 5 is a second gesture triggering status according to an embodiment of the present invention.
Figure 6:
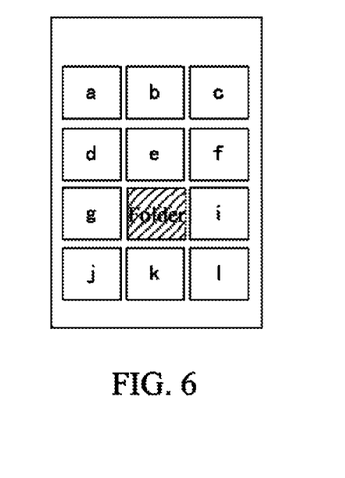
FIG. 6 is a third gesture triggering status according to an embodiment of the present invention.

For the embodiment that the specific area does not exist in the original status, the initial status of the interface is shown in FIG. 3:

the user selects the object with a finger or other input device, and touch screen device displays the specific area on the touch screen within particular time after detecting the input, as shown in FIG. 4;

when the user moves the object into an effective range of the specific area, the specific area obtains a triggering response and the specific area can be highlighted (for example, changing the background color, etc.), as shown in FIG. 5;

after the object is released, the touch screen device determines the type of the object; if it accords with the preconfigured acceptance property of folder in the current interface, then the operation of creating the new folder is valid, and one new folder is created at the position where the released object is originally located, and the object is put into this newly-created folder. If the object does not accord with the acceptance property of folder, then the operation of creating the new folder is invalid, and the object is returned back to the area before it is dragged, as shown in FIG. 6. Wherein, the acceptance property of folder is preconfigured, and the acceptance property of folder is preconfigured for each level of interface, for example, the type of object which can be saved in the acceptance property of folder in the standby interface is only the shortcut of the application.

Figure 8:
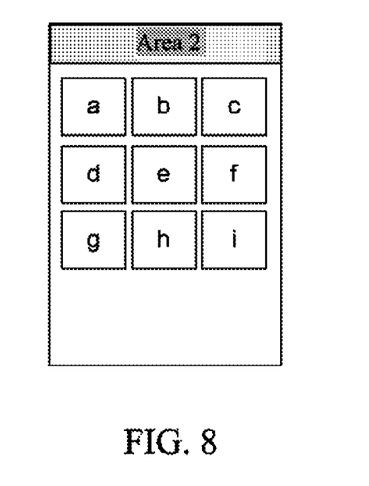
FIG. 8 is an original status with a specific area according to an embodiment of the present invention.

For the embodiment that the specific area exists in the original status, as shown in FIG. 8, the specific area exists in the original status; other embodiments are similar to the embodiment that the specific area does not exist in the original status, and they will no longer be described for details here.

Figure 9:
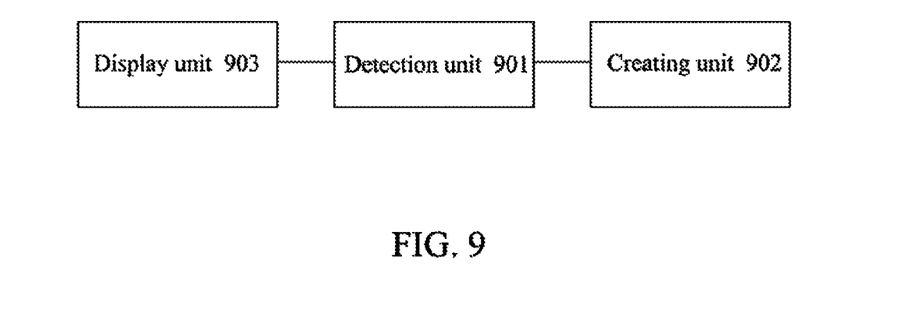
FIG. 9 is a structure diagram of a terminal according to an embodiment of the present invention.

In the present embodiment, as shown in FIG. 9, a terminal, configured with a touch screen thereon, includes:

a detection unit 901, configured to: detect operation actions performed by external to each object displayed on the touch screen; and a creating unit 902, configured to: create a new folder at any vacant position on a current interface after the detection unit detects that an object on the current interface is selected and dragged to a specific area and released, and save the object in the new folder.

Preferably, the creating unit 902 is configured to create a new folder at a position where the object is located before the object is dragged.

Preferably, the terminal further includes a display unit 903;

the display unit 903 is configured to display the specific area in the vacant position of the current interface before the object is selected; or the display unit 903 is configured to just display the specific area on the current interface when the detection unit detects that the object is selected, wherein the specific area does not include other folder in a display range of the current interface.

Preferably, the detection unit 901 is further configured to determine whether the type of the object belongs to a range of preconfigured acceptance property of folder in the current interface;

the creating unit 902 is configured to: when the detection unit determines that the type of the object belongs to the range of the preconfigured acceptance property of folder in the current interface, create a new folder at any vacant position on the current interface.

Preferably, the display unit 903 is further configured to: if the detection unit 901 determines that the type of the object does not belongs to the range of the preconfigured acceptance property of folder in the current interface, then prompt that creation of a folder fails.

In the present embodiment, another terminal configured with a touch screen thereon, includes:

a detection unit, configured to: detect operation actions performed by external to each object displayed on the touch screen; and a creating unit, configured to: create a new folder at any vacant position on a current interface after the detection unit detects that at least two objects on the current interface are successively selected and within a preset time range, dragged in succession to a specific area and released, and save the at least two objects in the new folder.

Preferably, the creation unit is configured to create a new folder at any vacant position on a current interface, specifically including that:

the creation unit is configured to create a new folder at a position where any one object of the at least two objects is located before the object is dragged.

Preferably, the detection unit is further configured to determine whether all types of the at least two objects belong to a range of preconfigured acceptance property of folder in the current interface;

the creating unit is configured to: in the at least two objects, create a new folder at a position where any one object is located before said any one object is dragged, wherein, the type of said any one object belongs to the range of the preconfigured acceptance property of folder in the current interface, and then save all objects of which the types belong to the range of the preconfigured acceptance property of folder in the current interface into the new folder.

Preferably, the detection unit is configured to: start timing whenever detecting that one object on the current interface is selected and dragged to the specific area and released; if determining that another object is selected and dragged to the specific area and released in the preset time range, then restart the timing, until no object is selected or dragged to the specific area and released in the preset time range.

Preferably, the detection unit is configured to: start timing when detecting that one object on the current interface is selected and dragged to the specific area and released, and count the objects which are selected and dragged to the specific area in the preset time range.

Preferably, the terminal further includes a display unit;

the display unit is configured to: display the specific area in the vacant position of the current interface before the object is selected; or the display unit is configured to: just display the specific area on the current interface when the detection unit detects that the object is selected, wherein the specific area does not include other folder in a display range of the current interface.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The patent document is not limit to any specific form of the combination of the hardware and software.

The above description is only the preferred embodiments of the present invention and is not intended to limit the protection scope of the patent document. The patent document can have a variety of other embodiments according to the content of the invention. Those skilled in the art can make the corresponding modifications and variations according to the patent document without departing from the spirit and essence of the patent document. All of modifications, equivalents and/or improvements without departing from the spirit and essence of the patent document should be included in the protection scope of the patent document.

INDUSTRIAL APPLICABILITY

The creation of a new folder is more intuitive in the embodiment of the present invention, and it is unnecessary to reserve space for a newly created folder or unnecessary to determine the type of file in advance. It can further improve user operation efficiency of creating and successively adding into a folder, thereby improving the user experience.

What is claimed is:

1. A method for creating a new folder on a touch screen device, comprising:

creating a new folder at any vacant position on a current interface after the touch screen device detects that at least two objects on the current interface are successively selected and within a preset time range, dragged in succession to a specific area and released, and saving the at least two objects in the new folder;

wherein before creating a new folder at any vacant position on a current interface, the method further comprises:

the touch screen device determining whether type of the at least two objects matches one or more types of acceptance properties which are preconfigured for a folder in the current interface;

the step of creating a new folder at any vacant position on a current interface comprises:

upon a determination that type of any one of the at least two objects matches the one or more types of acceptance properties, creating a new folder at any vacant position on the current interface, wherein, the step of the touch screen device detecting that at least two objects on the current interface are successively selected and within a preset time range, dragged in succession to a specific area and released comprises:

whenever the touch screen device detects that one object on the current interface is selected and dragged to the specific area and released, starting timing; when determining that another object is selected and dragged to the specific area and released in the preset time range, then restarting the timing, until no object is selected or dragged to the specific area and released in the preset time range.

2. The method according to claim 1, wherein, the step of creating a new folder at any vacant position on a current interface comprises:

creating a new folder at a position where any one object of the at least two objects is located before said any one object is dragged.

3. The method according to claim 1, wherein, the step of the touch screen device detecting that at least two objects on the current interface are successively selected and within a preset time range, dragged in succession to a specific area and released comprises:

when the touch screen device detects that one object on the current interface is selected and dragged to the specific area and released, starting timing, and counting objects which are selected and dragged to the specific area in the preset time range.

4. The method according to claim 3, wherein, the specific area has already been displayed in the vacant position of the current interface before a first object is selected; or the touch screen device just displays the specific area on the current interface when detecting that the first object is selected, and the specific area does not comprise other folder in a display range of the current interface.

5. The method according to claim 1, wherein, the specific area has already been displayed in the vacant position of the current interface before a first object is selected; or the touch screen device just displays the specific area on the current interface when detecting that the first object is selected, and the specific area does not comprise other folder in a display range of the current interface.

6. The method according to claim 1, wherein, the specific area has already been displayed in the vacant position of the current interface before a first object is selected; or the touch screen device just displays the specific area on the current interface when detecting that the first object is selected, and the specific area does not comprise other folder in a display range of the current interface.

7. A terminal comprising a touch screen device, an integrated circuit and a storage device, wherein the storage device stores circuit-executable programs, and the programs when executed perform operations comprising:

creating a new folder at any vacant position on a current interface after the touch screen device detects that at least two objects on the current interface are successively selected and within a preset time range, dragged in succession to a specific area and released, and saving the at least two objects in the new folder;

wherein before creating a new folder at any vacant position on a current interface, the method further comprises:

the touch screen device determining whether type of the at least two objects matches one or more types of acceptance properties which are preconfigured for a folder in the current interface;

the step of creating a new folder at any vacant position on a current interface comprises:

upon a determination that type of any one of the at least two objects matches the one or more types of acceptance properties, creating a new folder at any vacant position on the current interface, wherein, the step of the touch screen device detecting that at least two objects on the current interface are successively selected and within a preset time range, dragged in succession to a specific area and released comprises:

whenever the touch screen device detects that one object on the current interface is selected and dragged to the specific area and released, starting timing; when determining that another object is selected and dragged to the specific area and released in the preset time range, then restarting the timing, until no object is selected or dragged to the specific area and released in the preset time range.

8. The terminal according to claim 7, wherein, the operations further comprising:

creating a new folder at any vacant position on a current interface by a following way:

creating a new folder at a position where any one object of the at least two objects is located before said any one object is dragged.

9. The terminal according to claim 8, wherein, the operations further comprising:

comprising:

creating a new folder at any vacant position on a current interface and save the at least two objects in the new folder by a following way:

in the at least two objects, creating a new folder at a position where any one object is located before said any one object is dragged, wherein, the type of said any one object belongs to the range of the preconfigured acceptance property of folder in the current interface, and then saving all objects of which types belong to the range of the preconfigured acceptance property of folder in the current interface into the new folder.

10. The terminal according to claim 7, wherein, the operations further comprising: starting timing when detecting that one object on the current interface is selected and dragged to the specific area and released, and count objects which are selected and dragged to the specific area in the preset time range.

11. The terminal according to claim 10, wherein the operations further comprising:

displaying the specific area in the vacant position of the current interface before the object is selected; or just displaying the specific area on the current interface when the detection unit detects that the object is selected, wherein the specific area does not comprise other folder in a display range of the current interface.

12. The terminal according to claim 7, wherein the operations further comprising:
   displaying the specific area in the vacant position of the current interface before the object is selected; or
   just displaying the specific area on the current interface when the detection unit detects that the object is selected, wherein the specific area does not comprise other folder in a display range of the current interface.

\* \* \* \* \*